(12) United States Patent
Ayzenberg et al.

(10) Patent No.: US 10,185,758 B1
(45) Date of Patent: Jan. 22, 2019

(54) DIRECT TO REMOTE REPLICATION

(71) Applicant: EMC Corporation, Hopkinton, MA (US)

(72) Inventors: Lev Ayzenberg, Petach Tikva (IL); Asaf Natanzon, Tel Aviv (IL); Yael Golan, Holon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 393 days.

(21) Appl. No.: 14/755,258

(22) Filed: Jun. 30, 2015

(51) Int. Cl.
*G06F 17/30* (2006.01)
*G06F 15/173* (2006.01)
*G06F 13/12* (2006.01)

(52) U.S. Cl.
CPC ...... *G06F 17/30581* (2013.01); *G06F 13/122* (2013.01); *G06F 15/17331* (2013.01); *G06F 17/30309* (2013.01)

(58) Field of Classification Search
CPC ............. G06F 2201/84; G06F 11/2074; G06F 11/2064; G06F 3/061; G06F 17/30212; G06F 17/30371; G06F 17/30578; G06F 2202/84; G06F 3/067; G06F 3/065
See application file for complete search history.

(56) References Cited

U.S. PATENT DOCUMENTS

| | | | | |
|---|---|---|---|---|
| 7,120,769 B2* | 10/2006 | Yagawa | .............. | G06F 11/2058 707/999.202 |
| 2010/0017574 A1* | 1/2010 | Takahashi | ............... | G06F 3/061 711/162 |

* cited by examiner

*Primary Examiner* — Cheryl Lewis
(74) *Attorney, Agent, or Firm* — Krishnendu Gupta; Deepika Bhayana

(57) ABSTRACT

A computer implemented method, a computer program product, and a system for replicating data comprising: intercepting the IO data to a volume at the splitter; sending the IO data intercepted at the splitter to the volume; sending metadata of the IO data to a production RPA from the splitter, wherein an acknowledgement is sent to the splitter indicating that the metadata was received by the production RPA; and sending IO data, metadata, and timestamp of IO data to a remote site from the splitter, wherein IO data is sent to the remote site after splitter receives acknowledge of production RPA receiving the IO data.

19 Claims, 16 Drawing Sheets

DIRECT TO REMOTE REPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Conventionally, computer data is vital to today's organizations, and a significant part of protection against disasters may be focused on data protection. Traditionally, as solid-state memory has advanced to the point where cost of memory has become a relatively insignificant factor, organizations may be able to afford to operate with systems that store and process terabytes of data.

Generally, conventional data protection systems include tape backup drives, for storing organizational production site data on a periodic basis. Usually, such systems suffer from several drawbacks. Typically, a first drawback may be that they may require a system shutdown during backup, since the data being backed up cannot be used during the backup operation. Ordinarily, a second drawback may be that they may limit the points in time to which the production site can recover. Normally, if data is backed up on a daily basis, there may be several hours of lost data in the event of a disaster. Commonly, a third drawback may be that the data recovery process itself takes a long time.

Conventionally, data protection system may use data replication by creating a copy of the organization's production site data on a secondary backup storage system and by updating the backup with changes. Traditionally, the backup storage system may be situated in the same physical location as the production storage system, or in a physically remote location. Generally, data replication systems operate either at the application level, at the file system level, at the hypervisor level, or at the data block level.

Generally, current data protection systems may try to provide continuous data protection, which may enable the organization to roll back to any specified point in time within a recent history. Commonly, continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Typically, continuous data protection uses a technology referred to as "journaling," whereby a log is kept of changes made to the backup storage. Generally, during a recovery, the journal entries serve as successive "undo" information, enabling rollback of the backup storage to previous points in time. Traditionally, journaling was first implemented in database systems, and was later extended to broader data protection.

Commonly, one challenge to continuous data protection may be the ability of a backup site to keep pace with the data transactions of a production site, without slowing down the production site. Typically, the overhead of journaling inherently requires several data transactions at the backup site for each data transaction at the production site. Generally, as such, when data transactions occur at a high rate at the production site, the backup site may not be able to finish backing up one data transaction before the next production site data transaction occurs. Typically, if the production site is not forced to slow down, then necessarily a backlog of un-logged data transactions may build up at the backup site. Generally, without being able to satisfactorily adapt dynamically to changing data transaction rates, a continuous data protection system chokes and eventually forces the production site to shut down.

SUMMARY

A computer implemented method, a computer program product, and a system for replicating data comprising: intercepting the IO data to a volume at the splitter; sending the IO data intercepted at the splitter to the volume; sending metadata of the IO data to a production RPA from the splitter, wherein an acknowledgement is sent to the splitter indicating that the metadata was received by the production RPA; and sending IO data, metadata, and timestamp of IO data to a remote site from the splitter, wherein IO data is sent to the remote site after splitter receives acknowledge of production RPA receiving the IO data.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
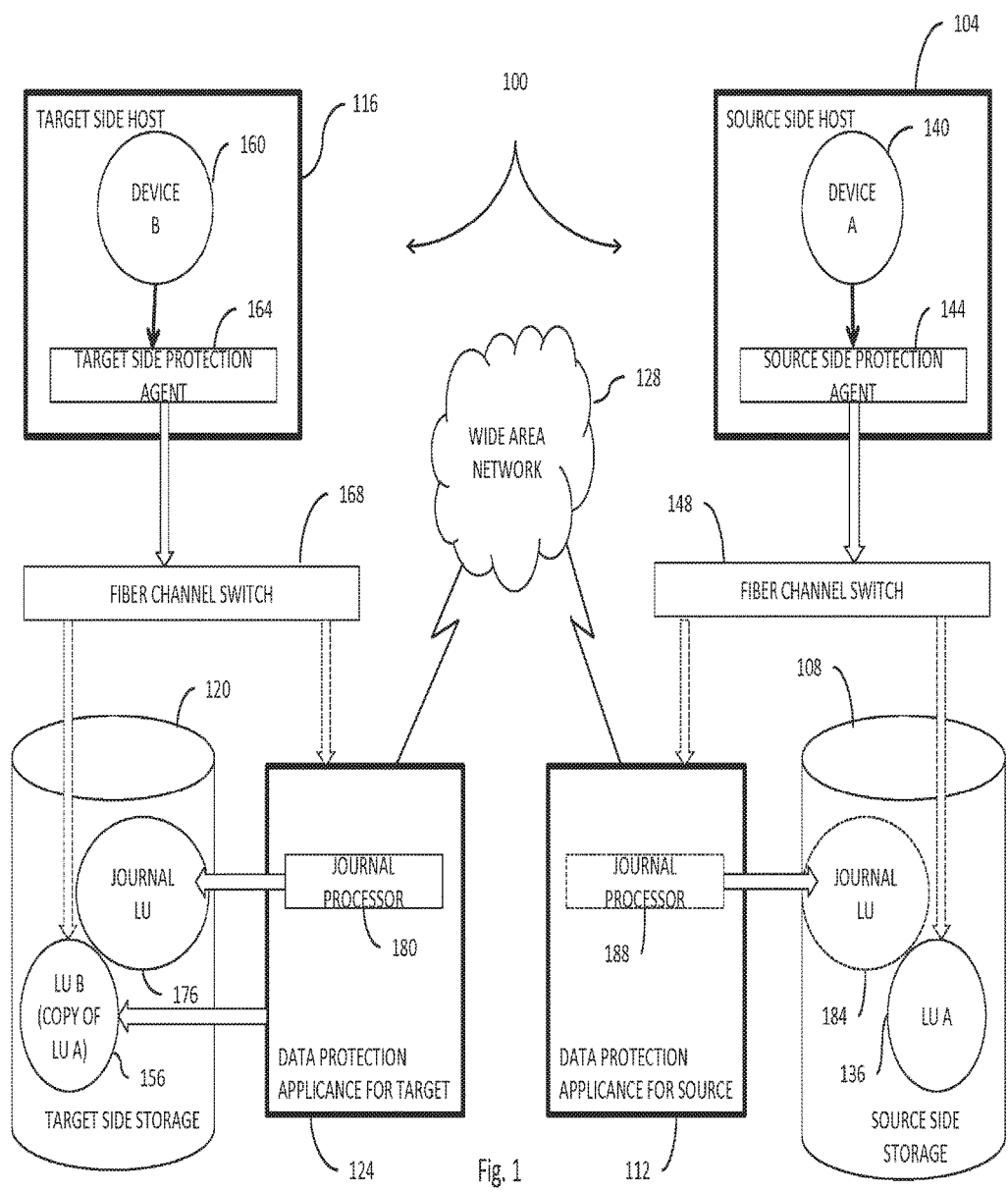
FIG. 1 is a simplified illustration of a data protection system, in accordance with an embodiment of the present disclosure.

In many embodiments, an appliance-based replication solution may involve a splitter that intercepts host write input/outputs (IOs) to a storage device. In some embodiments, intercepted IOs may be sent to a replication protection appliance (RPA). In certain embodiments, intercepted IOs may be sent to a storage device after the intercepted IOs are acknowledged by an RPA. In other embodiments, IOs may be sent to an RPA that may be responsible for replicating intercepted IOs.

In many embodiments, intercepted IOs may be sent to a production RPA from a splitter. In certain embodiments, intercepted IOs may be sent to a remote RPA from a production RPA. In other embodiments, intercepted IOs may be sent directly to a remote RPA from a splitter.

In many embodiments, a production RPA may be omitted in data flow. In some embodiments, omission of a production RPA in data flow may shorten IO latency. In other embodiments, production RPA may perform delta-marking and synchronization actions only. In certain embodiments, production RPA may be needed to set write-order fidelity and to close snapshots, specifically in multi host environments. In some embodiments, production RPA resources, such as memory and CPU, may not be used in case of bidirectional replication distribution processes.

In many embodiments, a splitter may intercept IOs from a host. In some embodiments, IO metadata of intercepted IOs from a host may be sent to a production RPA by a splitter. In certain embodiments, IO metadata may include volume id, offset, and length.

In many embodiments, a production RPA may respond to a splitter with an IO timestamp based on IO metadata. In certain embodiments, a timestamp may be referred to as ordering identification (ordering id). In other embodiments, a production RPA may save IO data to a delta-marking stream after a production RPA sends an IO timestamp to a splitter. In certain embodiments, an IO timestamp may increase from a time t from when production RPA received IO metadata of an IO. In some embodiments, after a splitter receives an IO timestamp from a production RPA, the splitter may simultaneously send IO to a storage device and send IO attached with IO timestamp directly to a remote RPA. In many embodiments, after a remote RPA receives an IO, a remote RPA may save an IO to a temporary buffer.

In certain embodiments, a storage device may send an acknowledgement of IO receipt to a splitter. In many embodiments, a splitter may send an acknowledgement of an IO received by a storage device to a host.

In other embodiments, a protocol between a remote RPA and a production RPA that notifies a delta marker of which IOs to flush may be used as an acknowledgement mechanism. In many embodiments, IO metadata of IOs are erased once IOs are flushed to a replica journal and a production volume. In some embodiments, a remote RPA may send an acknowledgement of receipt of an IO to a splitter for connection reasons. In many embodiments, a remote RPA may send an acknowledgement of receipt of an IO to a splitter for failure detection reasons. In certain embodiments, a remote RPA may send an acknowledgement of receipt of an IO to a splitter in an asynchronous manner.

In some embodiments, a production RPA may periodically initiate a synchronization mechanism. In many embodiments, a periodic synchronization mechanism may allow metadata saved to a delta-marking stream to be erased after IO data has been written to both a production site and a remote site. In certain embodiments, IO metadata may be used to differential which site to synchronize in an event of a disaster.

In many embodiments, resynchronization may occur after the start of replication or after a disaster. In some embodiments, resynchronization may occur by a production RPA by reading data in next dirty locations from a storage device. In other embodiments, dirty locations are locations marked in a delta marker. In certain embodiments, once data has been read by a production RPA, a timestamp may be associated with data to synchronize data and the synchronization data may be sent to a remote site from a production RPA. In other embodiments, a production RPA may send a splitter notification to read data from a production site storage device and send read data to a remote RPA. In some embodiments, a splitter may treat a request as an IO. In certain embodiments, a production RPA may not acknowledge overlapping write IOs during synchronization.

In many embodiments, a remote RPA may periodically send a production RPA a first timestamp of an IO up to which all IOs with a lower timestamp has arrived. In certain embodiments, periodically sending a first timestamp may allow a production RPA to release an IO from a delta marker stream once the IOs are written to a production site. In other embodiments a splitter may periodically send a production RPA the latest timestamp of an IO flushed to a production site storage device. In some embodiments, once an IO has been flushed to both a production site storage and a replica site storage, metadata associated with an IO may be erased from a delta marker stream.

In many embodiments, a production RPA may keep track of all IOs that arrive to a production RPA in a delta marker stream. In certain embodiments, the purpose of a delta marker stream may be to contain a list of locations which may be different between a production volume and replica volume. In some embodiments, a system may erase data in a delta marker stream provided data has arrived to both a replica journal and a replica volume.

In many embodiments, a protocol may describe the process to erase data from a delta marker stream. In some embodiments, data may arrive at a replica site buffer. In certain embodiments, once a replica site cache buffers have enough data, the replica cache buffers may flush data to a journal. In other embodiments, timestamps may be flushed in order as there may be multiple splitters where data may have arrived out of order. In many embodiments, replica RPA may order data based on timestamp and flush data, but may wait for missing IOs. In some embodiments, if all IOs up to n−1 arrived, IO n−1 did not arrive, and IO n, n+1 arrived, then only IOs up to n−2 may be flushed. In several embodiments, an acknowledgement may be sent to a production RPA that IO n−2 has been flushed. In some embodiments, a splitter may also send a production RPA a list of an IO written to a production volume where IOs may be flushed to a journal and a production RPA may erase data from a delta marker stream.

In many embodiments, a system, in an event of a failure, may enable a resynchronization protocol. In some embodiments, a system may fail due to a splitter crash, an RPA crash, a network failure between a splitter and a remote RPA, or a network failure between a production splitter and a production RPA.

In many embodiments, during a resynchronization protocol replication may be paused and restarted once an error has been corrected. In some embodiments, a list of locations which are marked as dirty in a delta marker stream may be resynchronized. In certain embodiments, a resynchronization protocol may entail an RPA deciding which device may need to be read. In many embodiments, an RPA may read data from a volume that may provide a timestamp of the data and the RPA may send timestamp to remote RPA. In other embodiments, an RPA may notify a splitter of a timestamp and a location that may need to read. In certain embodiments, while a location is being read by an RPA, the RPA may not give a timestamp for another split IO to arrive to the same location and the IO may be delayed until the initialization IO has arrived. In certain embodiments, write IOs may not be delayed, but may overwrite initialization IOs that were active at the same time.

The following may be helpful in understanding the specification and claims:

BACKUP SITE—may be a facility where replicated production site data is stored; the backup site may be located in a remote site or at the same location as the production site; a backup site may be a virtual or physical site CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines.

VIRTUAL VOLUME: may be a volume which is exposed to host by a virtualization layer, the virtual volume may be spanned across more than one site and or volumes VASA: may be a set of vCenter providers that allow an administrator to manage storage Virtualization filter appliance (VFA): may be a layer in the hypervisor that has the ability intercepts and split IO from a VM being written to a virtual disk. In some embodiments, the VFA may be running on a VM in a hypervisor This is an out of mechanism that allows storage management over web based APIs.

VVOL-filter—may be a VM utilizing a specialized Virtual machine, which may provide an infrastructure that allows for introducing a "device driver" into the virtualized IO stack provided by the Virtual machine Virtual RPA (vRPA)/Virtual DPA (vDPA): may be a DPA running in a VM.

VASA may be vSphere Storage application program interfaces (APIs) for Storage Awareness.

DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

Refer now to the example embodiment in FIG. 1, which is a simplified illustration of a data protection system 100, in accordance with an embodiment of the present invention. Shown in FIG. 1 are two sites—Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein below, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal.

Figure 2:
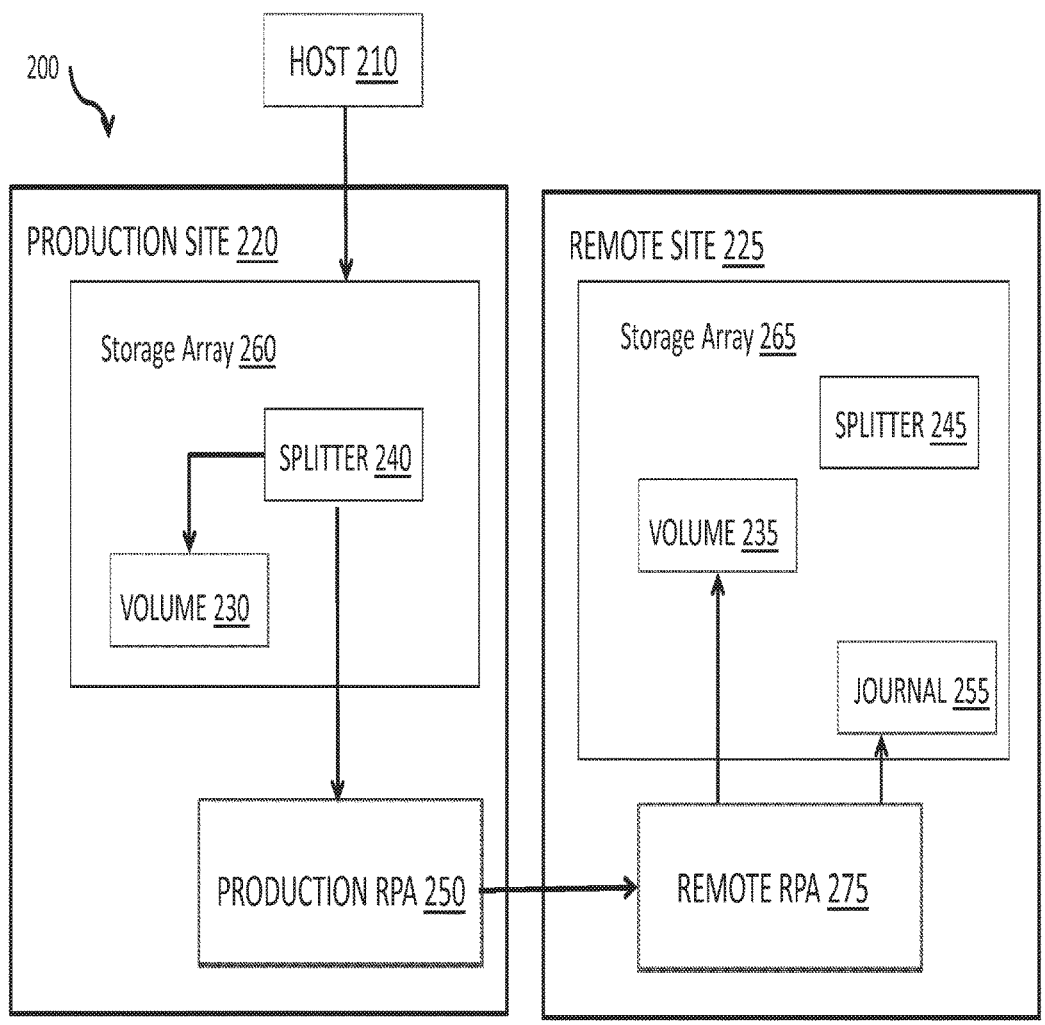
FIG. 2 is a simplified illustration of a block diagram of a system for replicating information from storage devices in accordance with an embodiment of present disclosure.

Refer now to the example embodiment of FIG. 2, which is a simplified illustration of a block diagram of a system for sending information from storage devices. In FIG. 2, system 200 includes production site 220, host 210, and remote site 225. Production site 220 includes storage array 260 and production RPA 250. Storage array 260 includes volume 230, splitter 240. Remote site 225 includes Storage array 265 and remote RPA 255. Storage array 265 includes splitter 245, volume 235, and journal 255.

Figure 3:
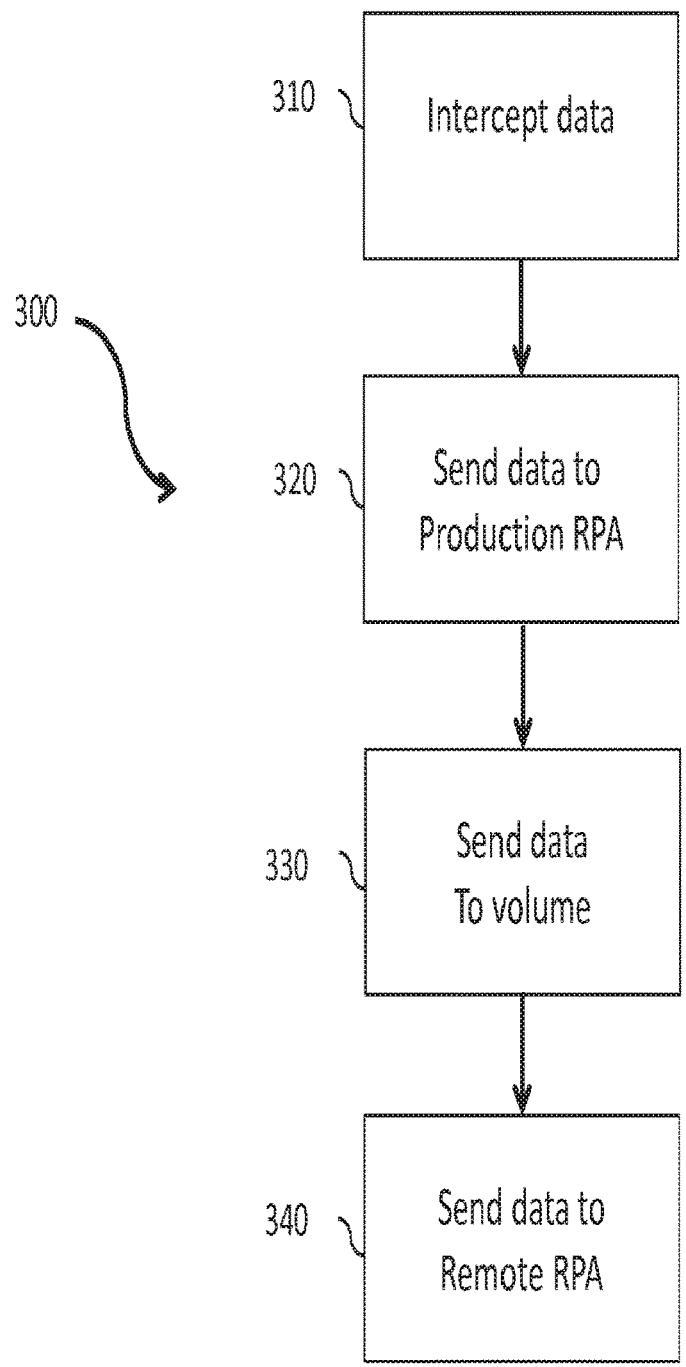
FIG. 3 is a simplified block diagram illustrating a method of replicating information from storage devices in accordance with an embodiment of present disclosure.

Refer now to the example embodiments of FIG. 2 and FIG. 3. FIG. 3 is a simplified block diagram illustrating a method of information from storage devices. In FIG. 2, splitter 240 intercepts IO directed to production volume 230 from host 210 (step 310). Splitter 240 sends IO to production RPA 250 (step 330). Splitter 240 sends IO to production volume 230 (step 340). Production RPA 250 sends IO to remote RPA 275 (step 350).

Figure 4:
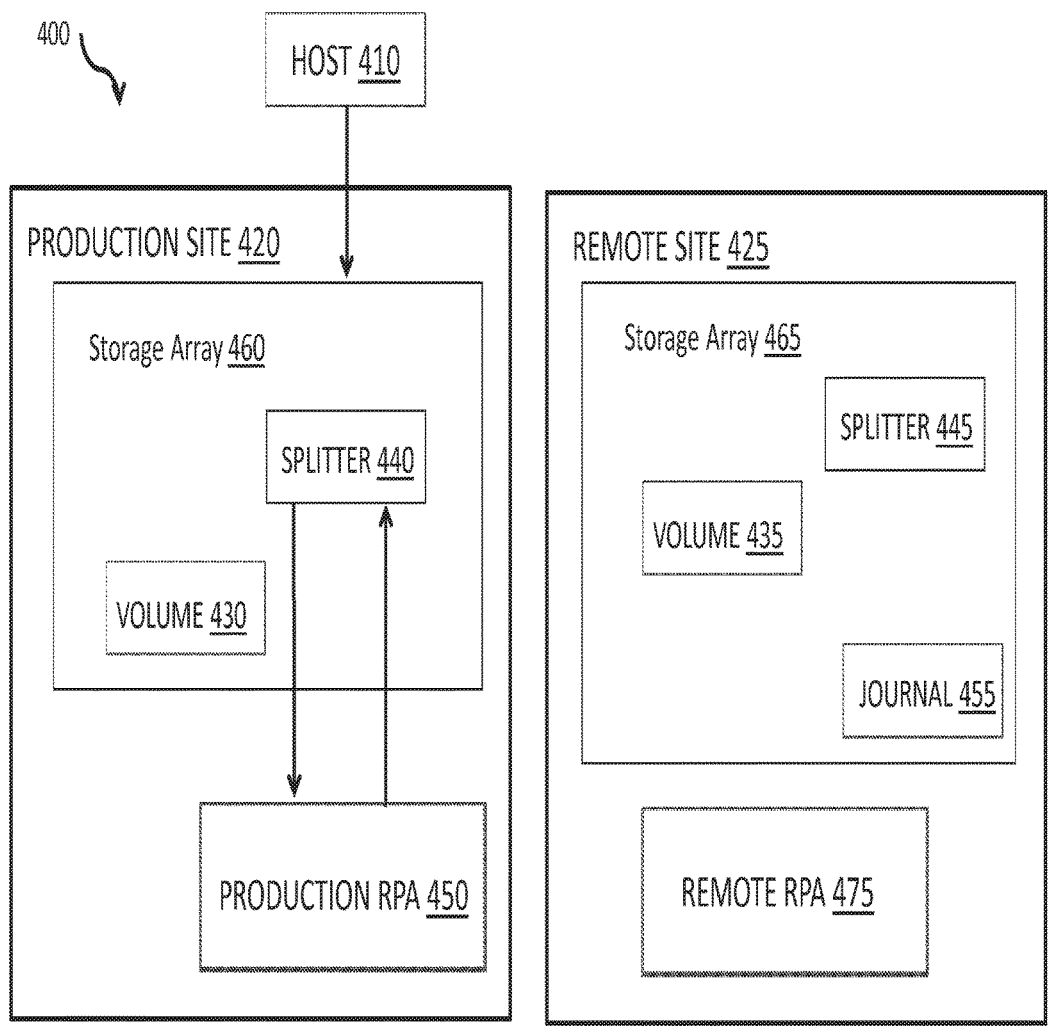
FIG. 4 is a simplified illustration of a block diagram of a system for sending metadata of information to a production RPA in accordance with an embodiment of present disclosure.

Refer now to the example embodiment of FIG. 4, which is a simplified illustration of a block diagram of a system for sending metadata of information to a production RPA. In FIG. 4, system 400 includes production site 420, host 410, and remote site 425. Production site 420 includes storage array 460 and Production RPA 450. Storage array 460 includes production volume 430 and splitter 440. Remote site 425 includes storage array 465 and remote RPA 475. Storage array 465 includes volume 435, splitter 445, and journal 455.

Figure 5:
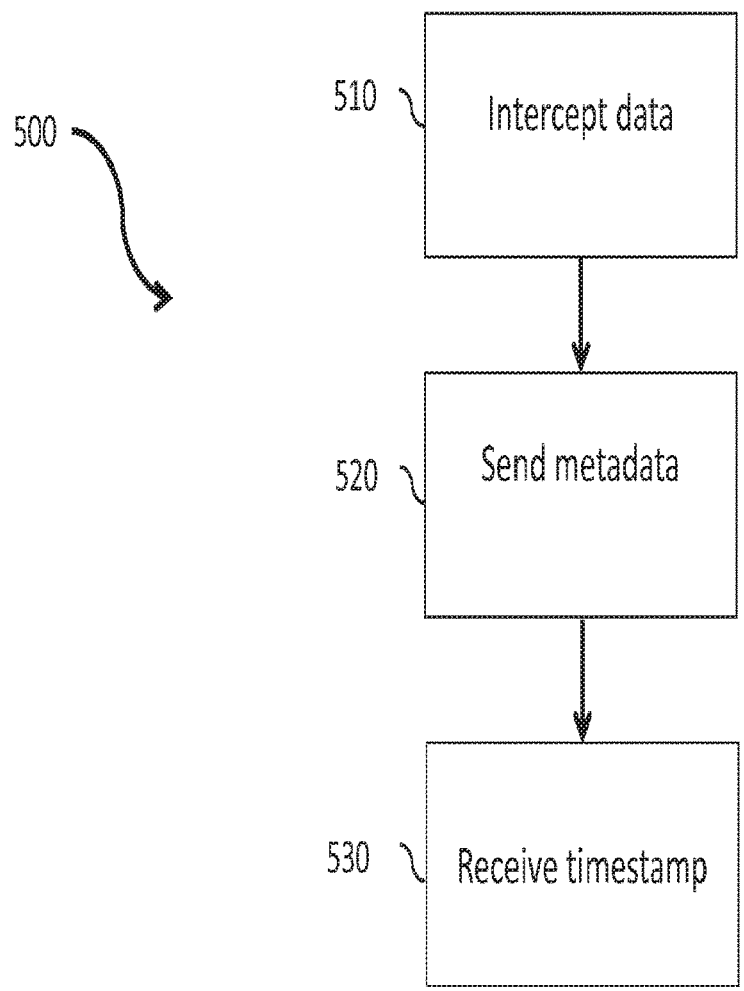
FIG. 5 is a simplified block diagram illustrating a method of sending metadata of information to a production RPA in accordance with an embodiment of present disclosure.

Refer now to the example embodiments of FIG. 4 and FIG. 5. FIG. 5 is a simplified block diagram illustrating a method of sending metadata of information to a production RPA. In FIG. 4, splitter 440 intercepts IO from host 410 directed to volume 430 (step 510). Splitter 440 sends IO metadata where meta data include IO offset, IO size and target volume of the IO to production RPA 450 (step 520). Production RPA 450 responds by sending IO timestamp to splitter 440 based on IO metadata (step 530), the IO timestamp is used to create ordering of the IOs and preserve write order fidelity.

Figure 6:
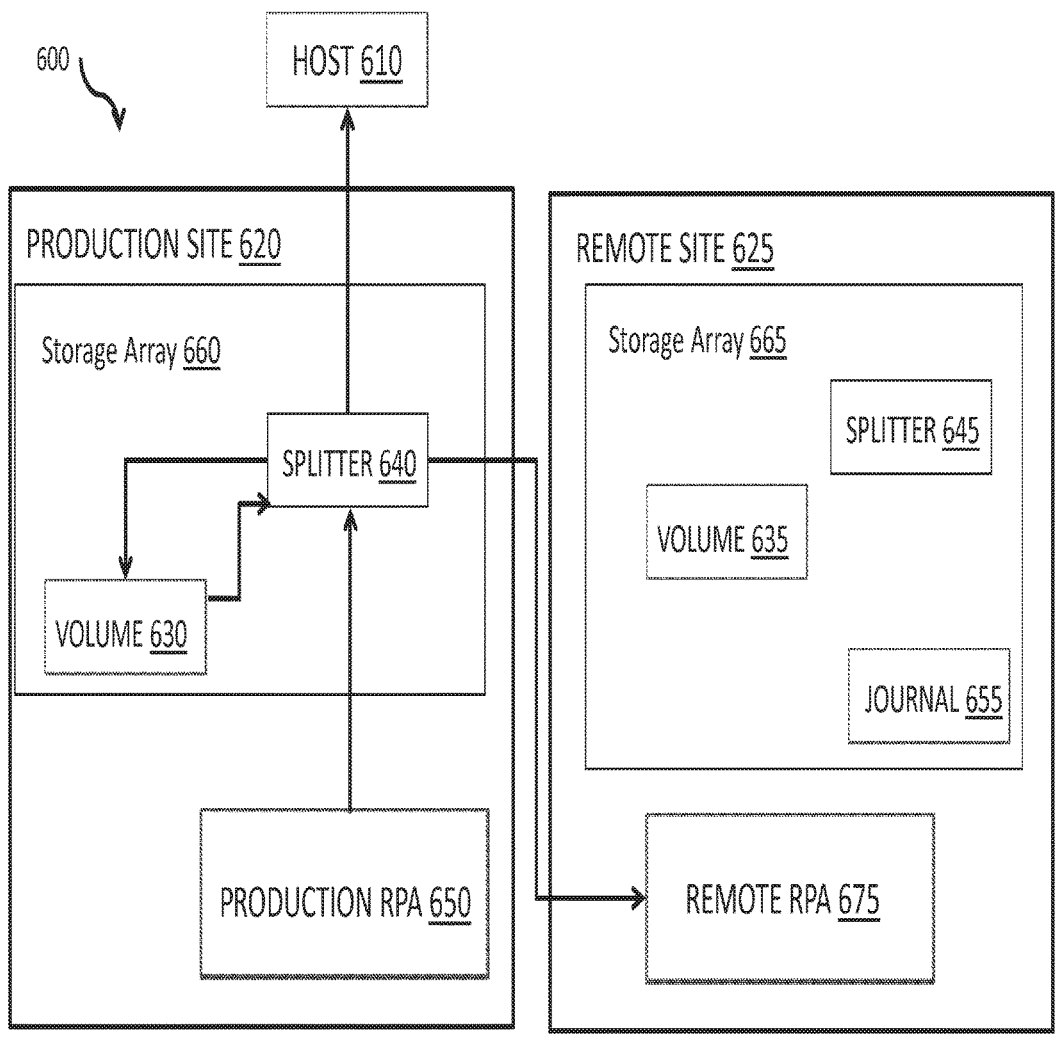
FIG. 6 is a simplified illustration of a block diagram of a system for receiving metadata of information at a splitter from a production RPA in accordance with an embodiment of present disclosure.

Refer now to the example embodiment of FIG. 6, which is a simplified illustration of a block diagram of a system for receiving metadata of information at a splitter from a production RPA. In FIG. 6, system 600 includes production site 620, host 610, and remote site 625. Production site 620 includes storage array 660, and production RPA 650. Storage array 660 includes production volume 630 and splitter 640. Remote site 625 includes storage array 665 and remote RPA 675. Storage array 665 includes splitter 645, volume 635, and journal 655.

Figure 7:
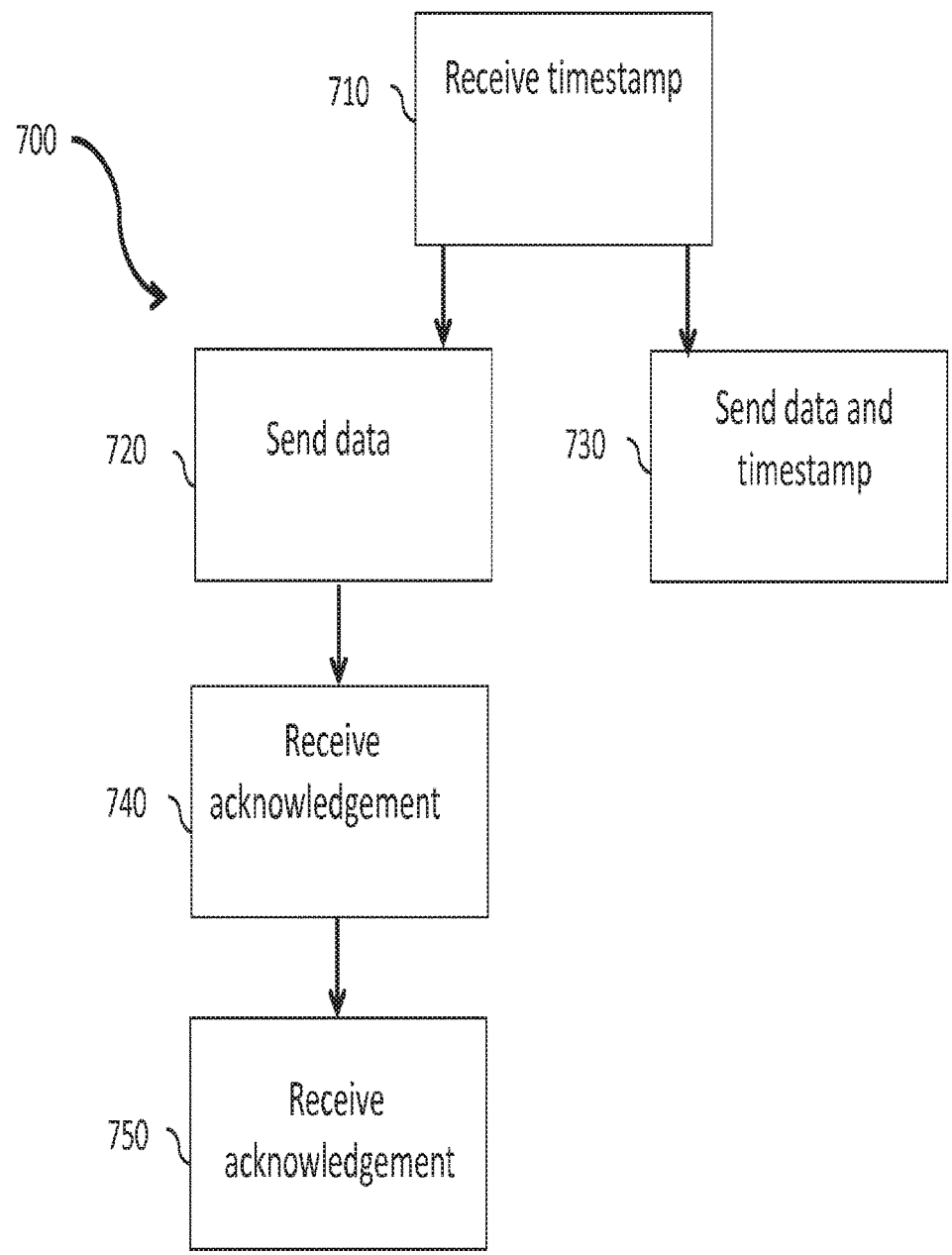
FIG. 7 is a simplified block diagram illustrating a method of receiving metadata of information at a splitter from a production RPA in accordance with an embodiment of present disclosure.

Refer now to example embodiments of FIG. 6 and FIG. 7. FIG. 7 is a simplified block diagram illustrating a method of receiving metadata of information at a splitter from a production RPA. In FIG. 6, splitter 640 receives IO timestamp from production RPA 650 (step 710). Production splitter 640 sends IO to volume 630 (step 720). Production RPA 650 sends IO Data, IO meta data, and IO timestamp to remote RPA 675 (step 730). Volume 630 sends an acknowledgement to splitter 640 indicating volume 630 received IO (step 740). Splitter 640 sends an acknowledgement to host 610 indicating that volume 630 received IO (step 750).

Figure 8:
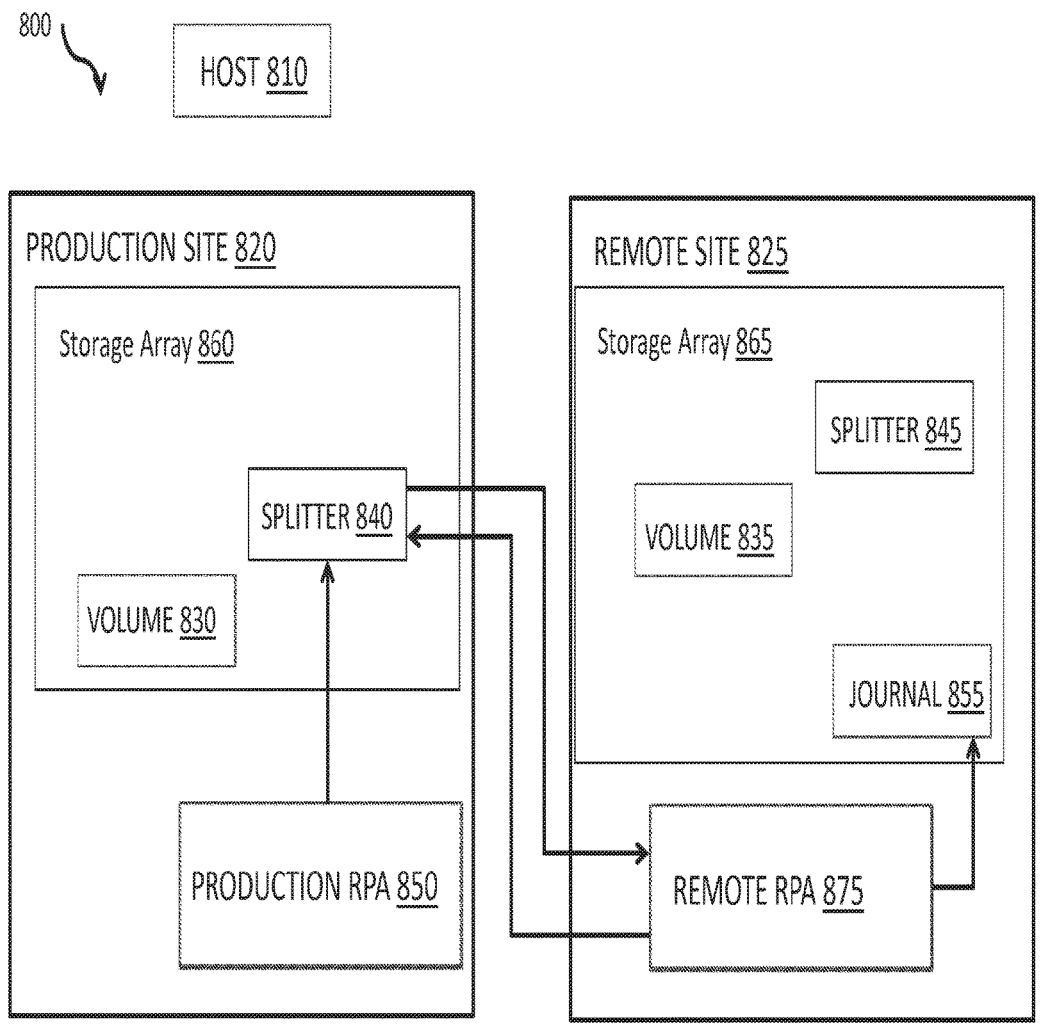
FIG. 8 is a simplified illustration of a block diagram of a system for replicating information to a remote site from a splitter in accordance with an embodiment of present disclosure.

Refer now to the example embodiment of FIG. 8, which is a simplified illustration of a block diagram of a system for sending information to a remote site from a splitter. In FIG. 8, system 800 includes production site 820, host 810, and remote site 825. Production site 820 includes storage array 860 and production RPA 850. Storage array 860 includes volume 830 and splitter 840. Remote site 825 includes storage array 865 and remote RPA 875. Storage array 865 includes splitter 845, volume 835, and journal 855.

Figure 9:
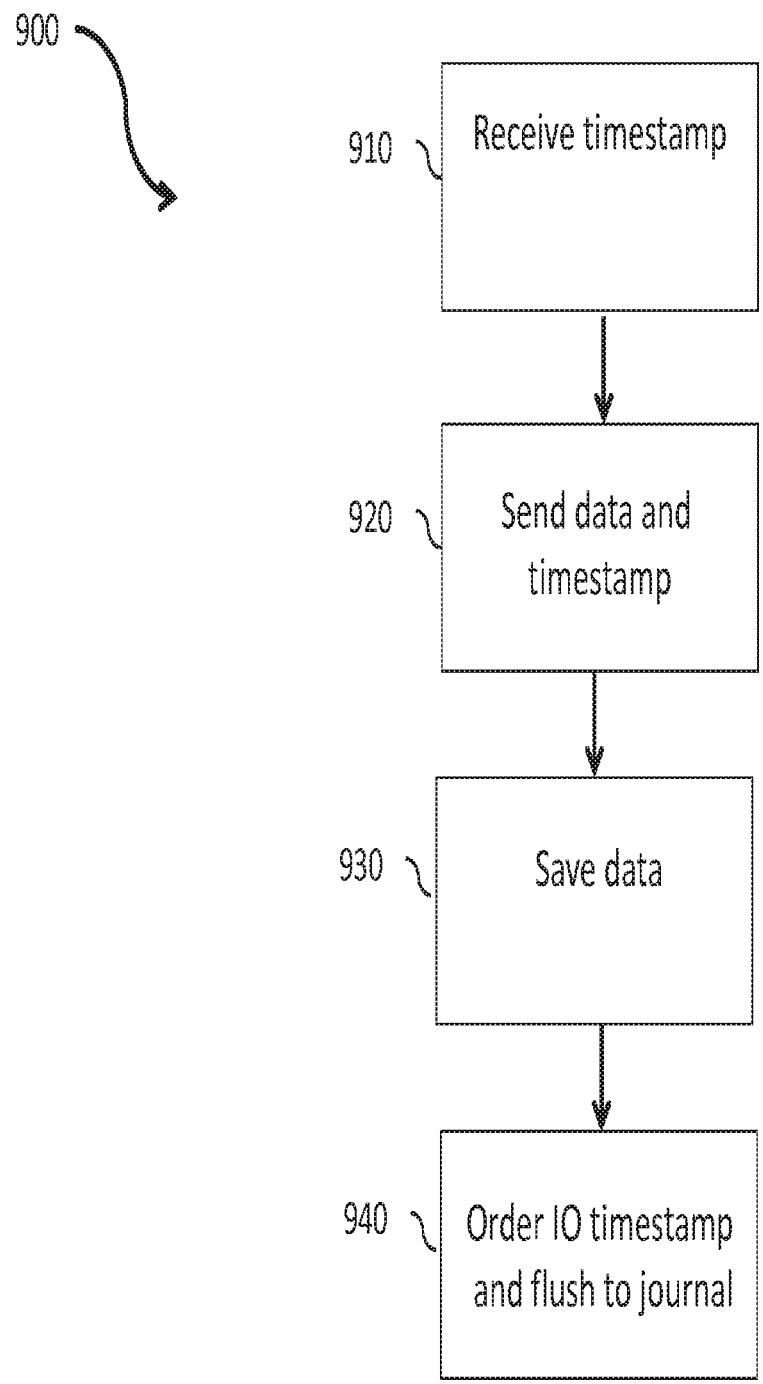
FIG. 9 is a simplified block diagram illustrating a method of replicating information to a remote site from a splitter in accordance with an embodiment of present disclosure.

Refer now to example embodiments of FIG. 8 and FIG. 9. FIG. 9 is a simplified block diagram illustrating a method of sending information to a remote site from a splitter. In FIG. 8, splitter 840 receives IO timestamp from production RPA 850 (step 910). Splitter 840 sends IO and IO timestamp to remote RPA 875 (step 920). Remote RPA 875 saves IO to journal 855 (step 930). RPA 875 orders the IOs according to the IO timestamp, as the IOs arriving to remote RPA 875 may arrive from multiple splitters, and then flushes IOs to journal 855 once all IOs up to a specific timestamp have arrived (step 940). Since production RPA 850 gives increasing order to IOs, remote RPA 875 can know whether some IOs are still in transit.

Figure 10:
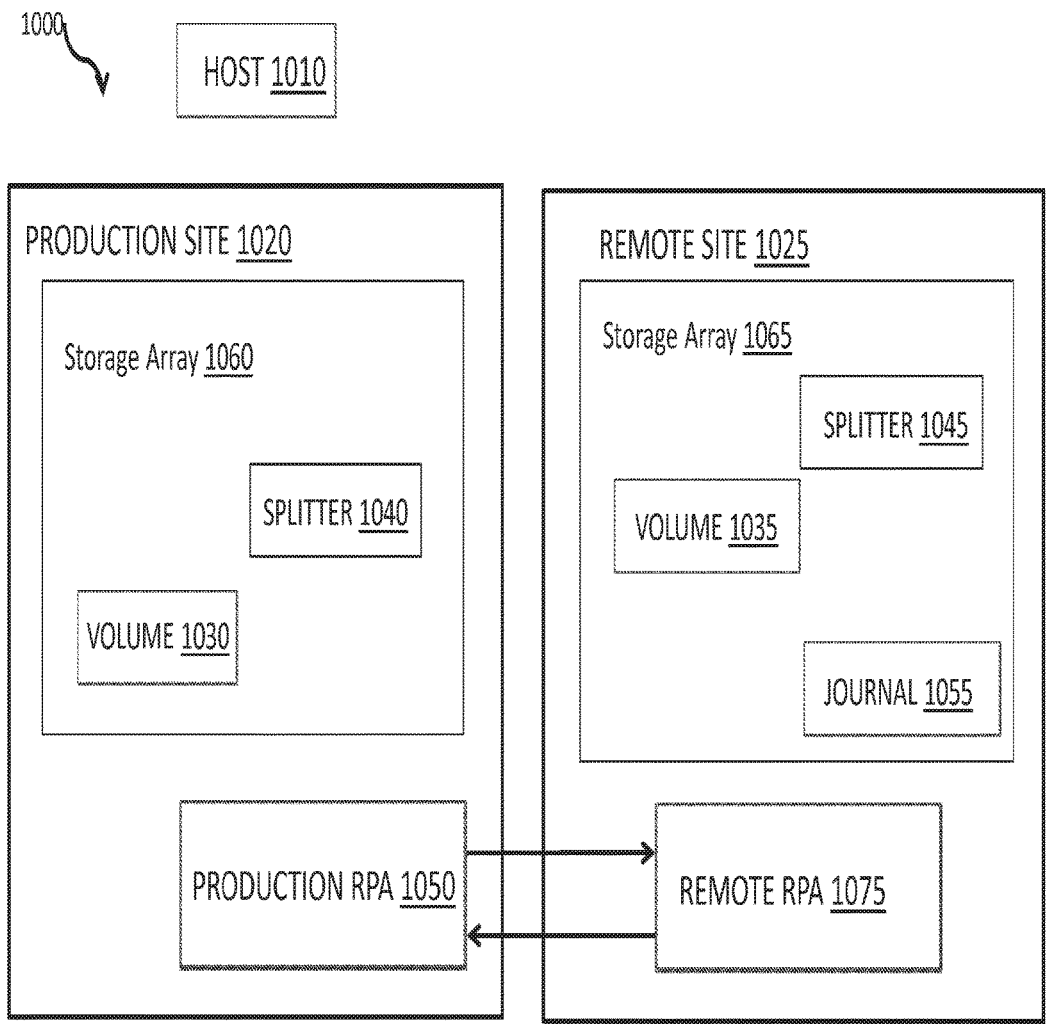
FIG. 10 is a simplified illustration of a block diagram of a system for synchronizing the flow of information between a production RPA and a remote RPA in accordance with an embodiment of present disclosure.

Refer now to the example embodiment of FIG. 10, which is a simplified illustration of a block diagram of a system for synchronizing the flow of information between a production RPA and a remote RPA. In FIG. 10, system 1000 includes production site 1020, host 1010, and remote site 1025. Production site 1020 includes storage array 1060 and Production RPA 1050. Storage array 1060 includes volume 1030 and splitter 1040. Remote site 1025 includes storage array 1065 and remote RPA 1075. Storage array 1075 includes splitter 1045, volume 1035, and journal 1055.

Figure 11:
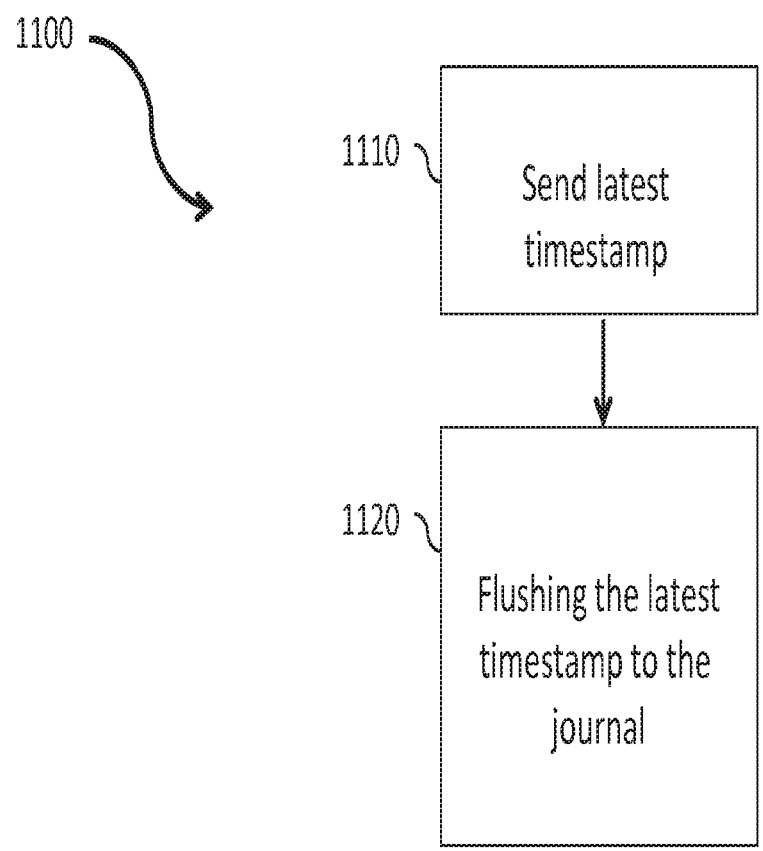
FIG. 11 is a simplified block diagram illustrating a method of synchronizing the flow of information between a production RPA and a remote RPA in accordance with an embodiment of present disclosure.

Refer now to example embodiments of FIG. 10 and FIG. 11. FIG. 11 is a simplified block diagram illustrating a method of synchronizing the flow of information between a production RPA and a remote RPA. In FIG. 10, remote RPA 1075 periodically sends the latest timestamp up until all previous timestamps have arrived (step 1110). Remote RPA 1075 flushing the latest timestamp to journal 1055 (step 1120).

Figure 12:
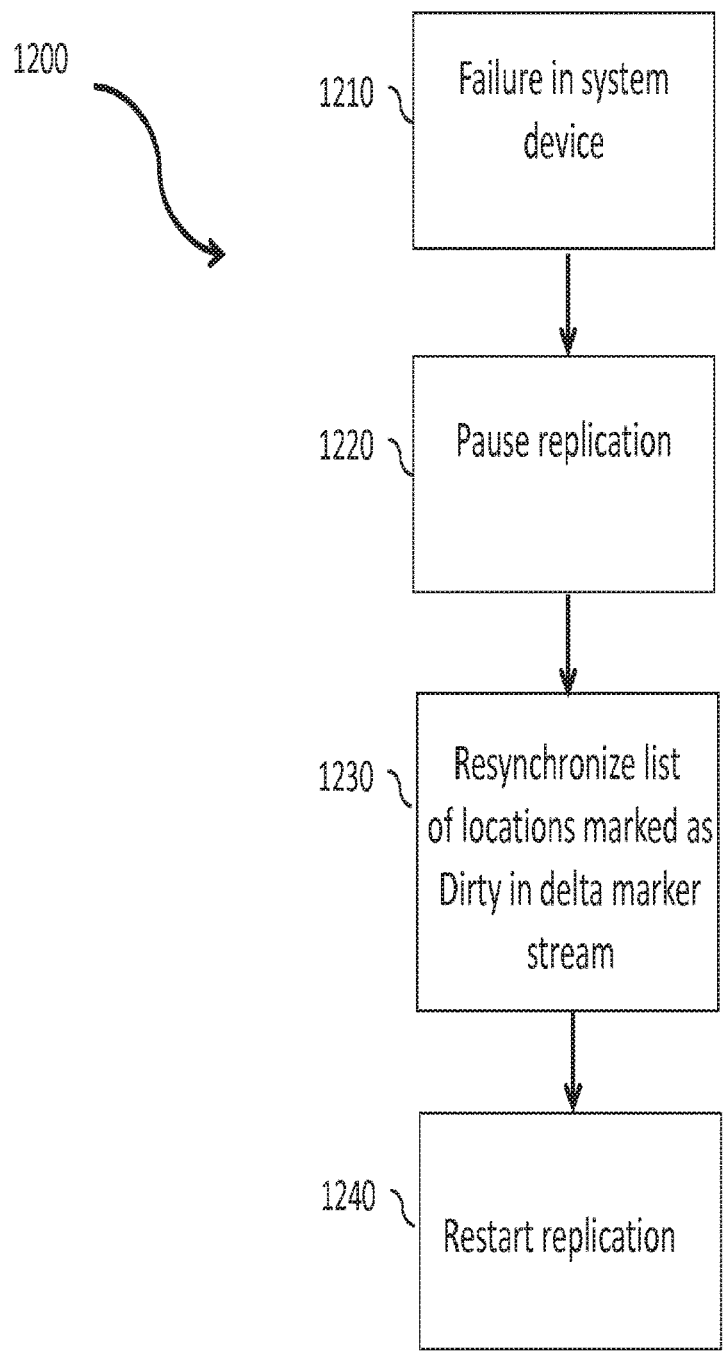
FIG. 12 is a simplified block diagram illustrating a method of a resynchronizing a system after system failure in accordance with an embodiment of the present disclosure.

Refer now to example embodiments of FIG. 2 and FIG. 12. FIG. 12 is a simplified block diagram illustrating a method of a resynchronizing a system after system failure. In FIG. 2, a component in system 200 fails (step 1210). Replication in system pauses (step 1220). Resynchronizing list of locations marked as dirty in delta marker streams occurs (step 1230). System 200 restarts replication (step 1240).

Figure 13:
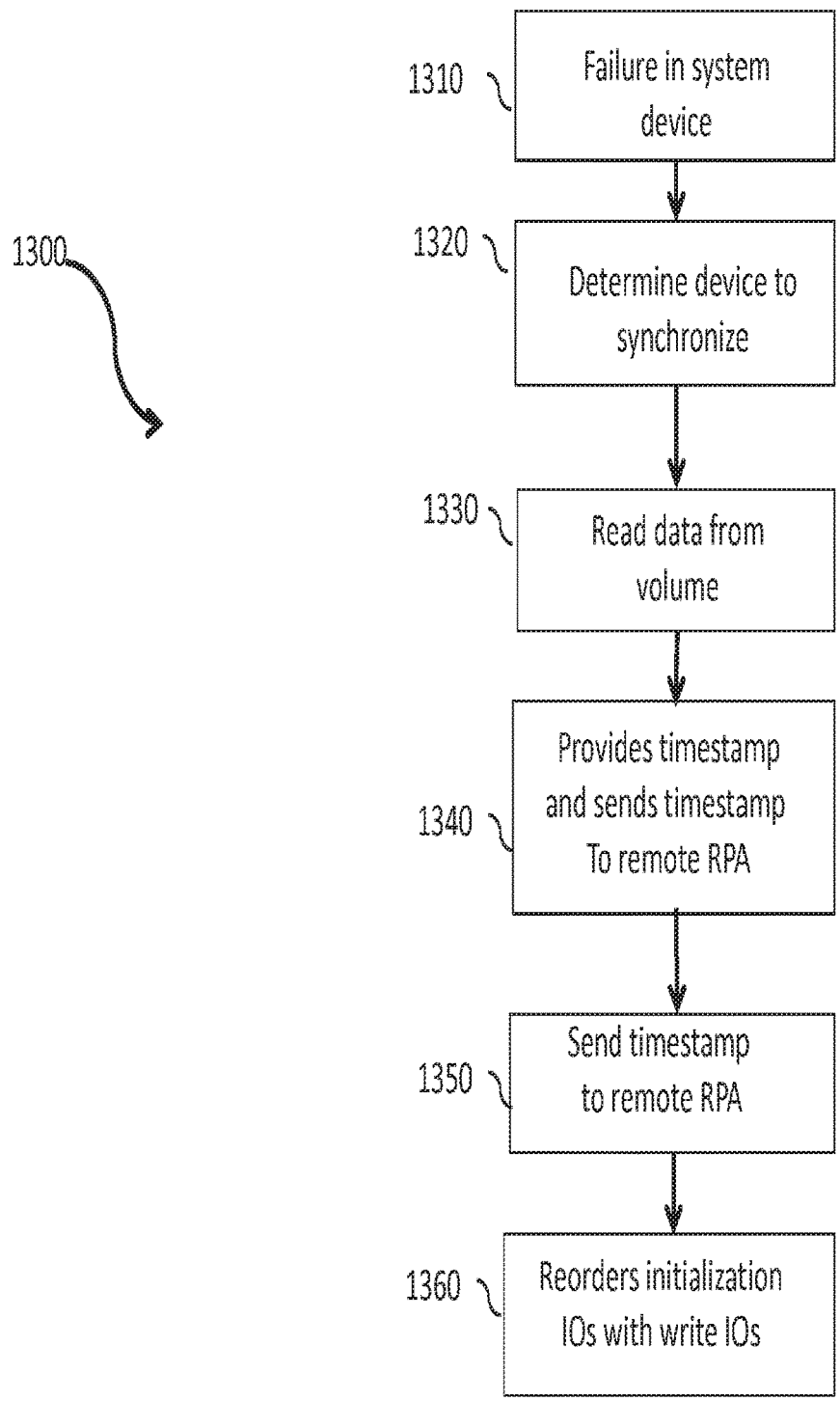
FIG. 13 is a simplified block diagram illustrating a method of a resynchronizing a system after system failure in accordance with an embodiment of present disclosure.

Refer now to example embodiments of FIG. 2 and FIG. 13. FIG. 13 is a simplified block diagram illustrating a method of a resynchronization protocol. In FIG. 2, a component in system 200 fails (step 1310). Production RPA 250 determines which device needs to be synchronized (step 1320). Production RPA 250 reads data from volume 230 (step 1330). Volume 230 provides timestamp of data (step 1340). Production RPA 250 sends data and timestamp of data to remote RPA 275 (step 1350). Remote RPA reorders initialization IOs with write IOs (step 1360).

Figure 14:
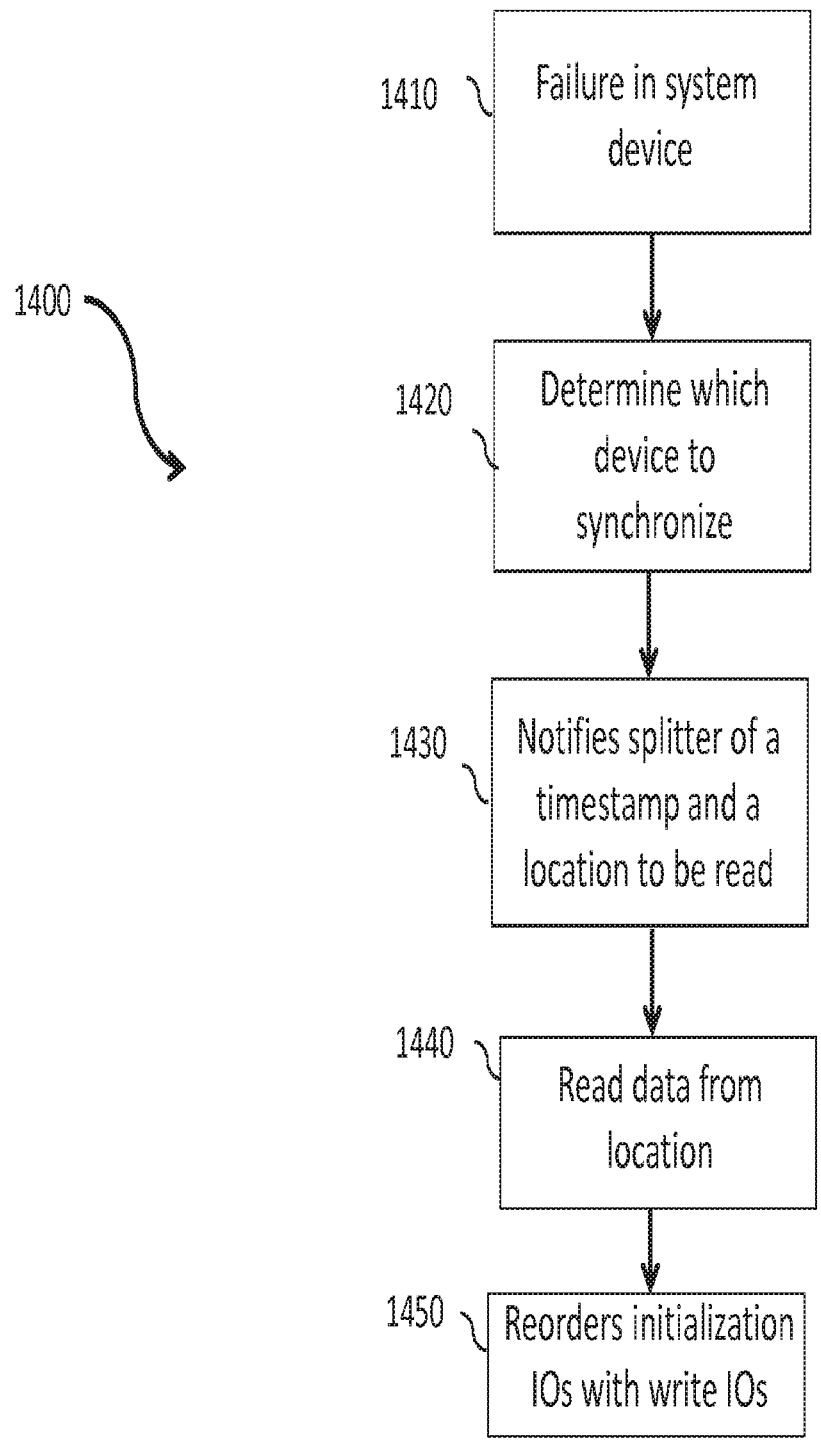
FIG. 14 is a simplified block diagram illustrating a method of a resynchronization protocol in accordance with an embodiment of the present disclosure.

Refer now to example embodiments of FIG. 2 and FIG. 14. FIG. 14 is a simplified block diagram illustrating a method of a resynchronization protocol. In FIG. 2, a component in system 200 fails (step 1410). Production RPA 250 determines which device needs to be synchronized (step 1420). Production RPA 250 notifies splitter 240 of a timestamp and which data to read from disk (step 1430). Splitter reads data from disk and sends to replica site 225 along with the timestamp provided by the production RPA 250 (step 1440). Remote RPA reorders initialization IOs with write IOs (step 1450).

Figure 15:
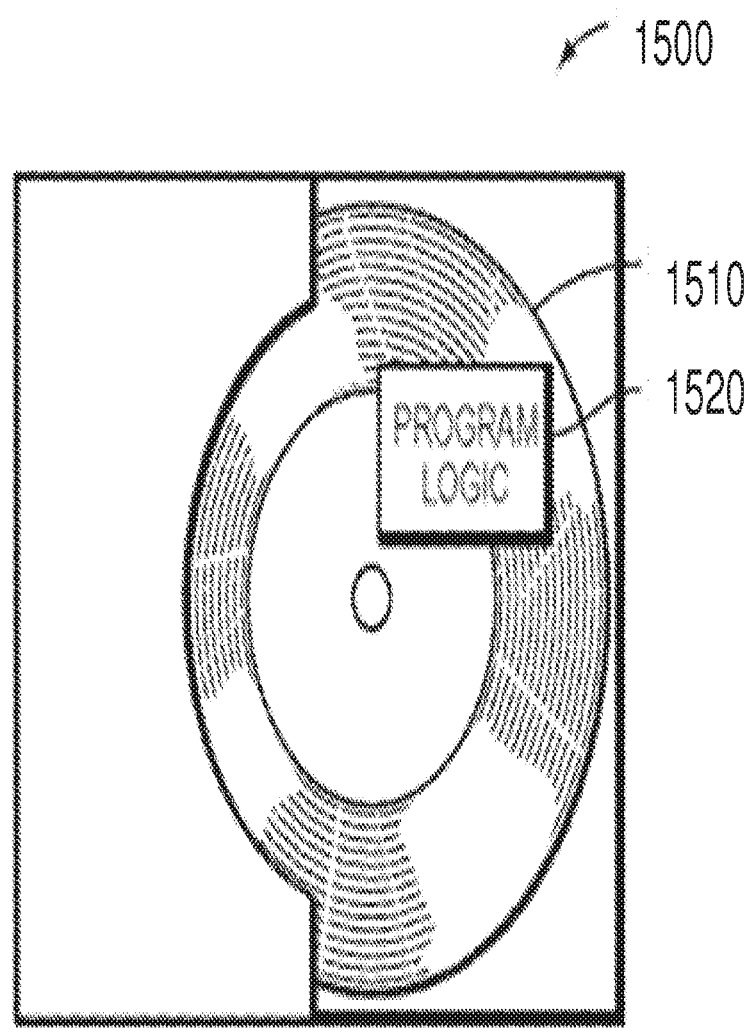
FIG. 15 is a diagram illustrating an example embodiment method of the present disclosure embodied as program code or a program product.

Refer now to the example embodiment of FIG. 15. FIG. 15 shows Program Logic 1520 embodied on a computer-readable medium 1510 as shown, and wherein the Program Logic 1520 is encoded in computer-executable code configured for carrying out the measurement and analysis process of this invention and thereby forming a Computer Program Product 1500.

The logic for carrying out the method may be embodied as part of the aforementioned system, which is useful for carrying out a method described with reference to embodiments shown in, for example, FIG. 3, FIG. 5, FIG. 7, FIG. 9, FIG. 11, FIG. 12, FIG. 13, and FIG. 14. For purposes of illustrating the present invention, the invention is described as embodied in a specific configuration and using special logical arrangements, but one skilled in the art will appreciate that the device is not limited to the specific configuration but rather only by the claims included with this specification.

Figure 16:
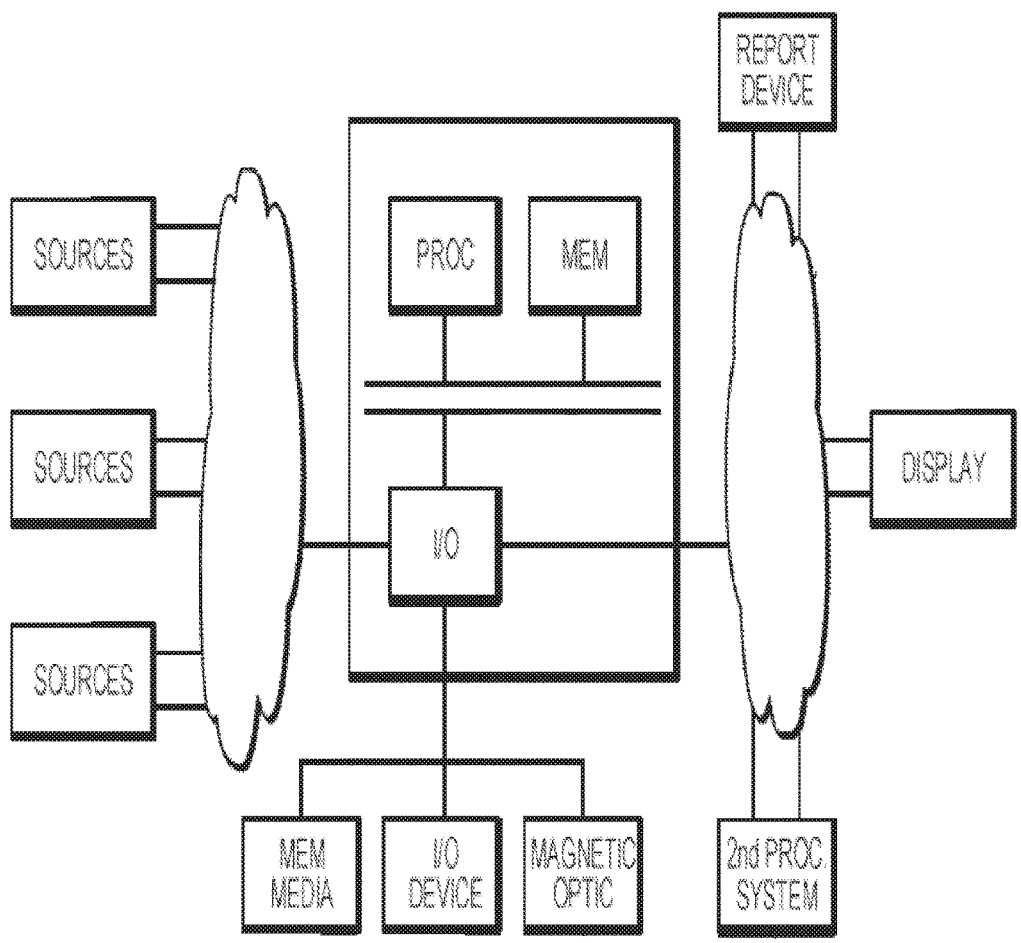
FIG. 16 is an example of an embodiment of an apparatus that may utilize the techniques described herein, in accordance with an embodiment of the present disclosure.

Refer now to the example embodiment of FIG. 16. The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 16, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. A processor may be a physical processor or one or a virtual processor. In certain embodiments, a virtual processor may correspond to one or more or parts of one or more physical processors.

The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A computer implemented method for replicating data, the method comprising:

intercepting, at a splitter of a storage system, input/output
        (IO) data sent from a host computer and directed to a production volume of the storage system, the splitter communicatively coupled to the host computer, the production volume, and a production Replication Protection Device (RPA), the production RPA tracking IOs received from the host computer in a delta marker stream through IO metadata obtained from the IO data;

forwarding, via the splitter, the intercepted IO data to the production volume;

sending, via the splitter, the IO metadata to the production RPA, the IO metadata including a volume ID, offset, and length;

receiving, at the splitter, an acknowledgement from the production RPA indicating that the IO metadata was received by the production RPA;

sending, via the splitter upon receiving the acknowledgement, the IO data, the IO metadata, and a timestamp of the IO data to a remote site; and initializing a resynchronization mechanism, the resynchronization mechanism comprising reading data from dirty locations in the delta marker stream by the production RPA, attaching a timestamp to the data to synchronize the data, and sending the synchronized data to the remote site, wherein the dirty locations are locations marked in the delta marker stream.

2. The method of claim 1, wherein sending the IO metadata of the IO data to the production RPA further comprises saving the metadata to the delta marker stream.

3. The method of claim 1, wherein sending the IO metadata of the IO data to the production RPA further comprises responding with the timestamp of the IO data to the splitter.

4. The method of claim 1, further comprising saving the IO data replicated to the remote site to a replica journal.

5. The method of claim 3, wherein sending IO data, the IO metadata, and the timestamp of the IO data to the remote site further comprises a replica RPA in the remote site placing the IO data in order based on the timestamp of the IO data in a replica journal in the remote site.

6. The method of claim 5, wherein IOs are flushed up to a timestamp only after all prior IOs have arrived at the remote site, and wherein IO metadata of IOs are erased once the IOs are flushed to the replica journal and the production volume.

7. The method of claim 1, further comprising a resynchronization process of a location, wherein the resynchronization process of a location includes notifying the splitter of a location to be synchronized and a timestamp reading the data from production volume by the splitter and sending data and meta-data to a remote replication appliance (RPA) at the remote site.

8. A computer program product including a non-transitory computer readable storage medium having computer program code encoded thereon that when executed on a processor of a computer causes the computer to operate a computer system, the computer program product comprising program code enabling:

intercepting, at a splitter of a storage system, input/output (IO) data sent from a host system and directed to a volume of the storage system, the splitter communicatively coupled to the host system, the production volume, and a production Replication Protection Device (RPA), the production RPA tracking IOs received from the host system in a delta marker stream through IO metadata obtained from the IO data;

forwarding, via the splitter, the intercepted IO data to the production volume;

sending, via the splitter, the IO metadata to the production, the IO metadata including a volume ID, offset, and length;

receiving, at the splitter, an acknowledgement from the production RPA indicating that the IO metadata was received by the production RPA;

sending, via the splitter upon receiving the acknowledgement, the IO data, the IO metadata, and a timestamp of the IO data to a remote; and initializing a resynchronization mechanism, the resynchronization mechanism comprising reading data from dirty locations in the delta marker stream by the production RPA, attaching a timestamp to the data to synchronize the data, and sending the synchronized data to the remote site, wherein the dirty locations are locations marked in the delta marker stream.

9. The computer program product of claim 8, wherein sending the IO metadata of the IO data to the production RPA further comprises saving the metadata to the delta marker stream.

10. The computer program product of claim 8, wherein sending the IO metadata of the IO data to the production RPA further comprises responding with the timestamp of the IO data to the splitter by the production RPA, and wherein sending the IO data, the IO metadata, and the timestamp of the IO data to the remote site further comprises a replica RPA in the remote site placing the IO data in order based on the timestamp of the IO data in a replica journal in the remote site.

11. The computer program product of claim 10, wherein IOs are flushed up to a timestamp only after all prior IOs have arrived at the remote site, and wherein IO metadata of IOs are erased once the IOs are flushed to the replica journal and the production volume.

12. The computer program product of claim 8, further comprising saving the IO data replicated to the remote site to a replica journal.

13. The computer program product of claim 8, further comprising a resynchronization process of a location, wherein the resynchronization process of a location includes notifying the splitter of a location to be synchronized and a timestamp reading the data from production volume by the splitter and sending data and meta-data to a remote replication appliance (RPA) at the remote site.

14. A system for replicating data, the method comprising:
a storage system;
a host computer having a processor, the host computer communicatively coupled to the storage system; and
computer-executable program code operating in a memory communicatively coupled to the processor, wherein the computer-executable program code is configured to enable the host computer to execute the following:

intercepting, at a splitter of the storage system, input/output (IO) data sent from the host computer and directed to a production volume of the storage system, the splitter communicatively coupled to the host computer, the production volume, and a production Replication Protection Device (RPA), the production RPA tracking IOs received from the host computer in a delta marker stream through IP metadata obtained from the IO data;

forwarding, via the splitter, the intercepted IO data to the production volume;

sending, via the splitter, the IO metadata to the production RPA, the IO metadata including a volume ID, offset, and length;

receiving, at the splitter, an acknowledgement from the production RPA indicating that the metadata was received by the production RPA;

sending, via the splitter upon receiving the acknowledgement, the IO data, the IO metadata, and a timestamp of the IO data to a remote site; and initializing a resynchronization mechanism, the resynchronization mechanism comprising reading data from dirty locations in the delta marker stream by the production RPA, attaching a timestamp to the data to synchronize the data, and sending the synchronized data to the remote site, wherein the dirty locations are locations marked in the delta marker stream.

15. The system of claim 14, wherein sending the IO metadata of the IO data to the production RPA further comprises saving the metadata to the delta marker stream.

16. The system of claim 14, wherein sending the IO metadata of the IO data to the production RPA further comprises responding with the timestamp of the IO data to the splitter by the production RPA, and wherein sending the IO data, the IO metadata, and the timestamp of the IO data to the remote site further comprises a replica RPA in the remote site placing the IO data in order based on the timestamp of the IO data in a replica journal in the remote site.

17. The system of claim 16, wherein IOs are flushed up to a timestamp only after all prior IOs have arrived at the remote site, and wherein IO metadata of IOs are erased once the IOs are flushed to the replica journal and the production volume.

18. The system of claim 14, further comprising saving the IO data replicated to the remote site to a replica journal.

19. The system of claim 14, further comprising resynchronization process of a location, wherein the resynchronization process of a location includes notifying the splitter of a location to be synchronized and a timestamp reading the data from production volume by the splitter and sending data and meta-data to a remote replication appliance (RPA) at the remote site.

* * * * *